US012586353B2

(12) United States Patent
Kabra et al.

(10) Patent No.: US 12,586,353 B2
(45) Date of Patent: Mar. 24, 2026

(54) UNSUPERVISED LEARNING OF OBJECT REPRESENTATIONS FROM VIDEO SEQUENCES USING ATTENTION OVER SPACE AND TIME

(71) Applicant: GDM Holding LLC, Mountain View, CA (US)

(72) Inventors: Rishabh Kabra, London (GB); Daniel Zoran, London (GB); Goker Erdogan, London (GB); Antonia Phoebe Nina Creswell, London (GB); Loic Matthey-de-l'Endroit, London (GB); Matthew Botvinick, Philadelphia, PA (US); Alexander Lerchner, London (GB); Christopher Paul Burgess, Purley (GB)

(73) Assignee: GDM Holding LLC, Mountain View, CA (US)

( * ) Notice: Subject to any disclaimer, the term of this patent is extended or adjusted under 35 U.S.C. 154(b) by 145 days.

(21) Appl. No.: 18/289,171

(22) PCT Filed: May 27, 2022

(86) PCT No.: PCT/EP2022/064484
§ 371 (c)(1),
(2) Date: Nov. 1, 2023

(87) PCT Pub. No.: WO2022/248712
PCT Pub. Date: Dec. 1, 2022

(65) Prior Publication Data
US 2024/0221362 A1     Jul. 4, 2024

Related U.S. Application Data

(60) Provisional application No. 63/194,849, filed on May 28, 2021.

(51) Int. Cl.
*G06V 10/771* (2022.01)
*G06T 9/00* (2006.01)
(Continued)

(52) U.S. Cl.
CPC .............. *G06V 10/771* (2022.01); *G06T 9/00* (2013.01); *G06V 10/44* (2022.01); *G06V 10/82* (2022.01)

(58) Field of Classification Search
CPC ...... G06V 10/771; G06V 10/44; G06V 10/82; G06T 9/00; G06N 3/045; G06N 3/0455;
(Continued)

(56) References Cited

U.S. PATENT DOCUMENTS

| 2021/0081844 | A1 | 3/2021 | Bhattacharya et al. |
| 2021/0134002 | A1 | 5/2021 | Yao et al. |
| 2021/0142120 | A1 | 5/2021 | Min et al. |

FOREIGN PATENT DOCUMENTS

| CN | 112789625 A | 5/2021 |
| EP | 3663965 A1 | 6/2020 |

(Continued)

OTHER PUBLICATIONS

Space-Time Attention, Bertasius et al Apr. 2021 (Year: 2021).*

(Continued)

*Primary Examiner* — Jianxun Yang
(74) *Attorney, Agent, or Firm* — Fish & Richardson P.C.

(57) ABSTRACT

A computer-implemented video generation neural network system, configured to determine a value for each of a set of object latent variables by sampling from a respective prior object latent distribution for the object latent variable. The system comprises a trained image frame decoder neural network configured to, for each pixel of each generated image frame and for each generated image frame time step process determined values of the object latent variables to (Continued)

determine parameters of a pixel distribution for each of the object latent variables, combine the pixel distributions for each of the object latent variables to determine a combined pixel distribution, and sample from the combined pixel distribution to determine a value for the pixel and for the time step.

20 Claims, 7 Drawing Sheets

(51) Int. Cl.
    *G06V 10/44*     (2022.01)
    *G06V 10/82*     (2022.01)
(58) Field of Classification Search
    CPC .... G06N 3/0464; G06N 3/047; G06N 3/0475;
            G06N 3/0895; G06N 3/092; G06N 3/088
    See application file for complete search history.

(56) References Cited

FOREIGN PATENT DOCUMENTS

| WO | WO 2018/083668 A1 | 5/2018 |
|----|-------------------|--------|
| WO | WO 2018/224690 A1 | 12/2018 |
| WO | WO 2019/155065 A1 | 8/2019 |
| WO | WO 2020/237136 A1 | 11/2020 |
| WO | WO 2021/096739 A1 | 5/2021 |

OTHER PUBLICATIONS

SSAN, Guo et al May 27, 2021 (Year: 2021).*
Sequential View Synthesis, Nguyen-Ha et al 2020 (Year: 2020).*
Notice of Allowance in Japanese Appln. No. 2023-568562, dated Dec. 9, 2024, 6 pages (with English translation).
Abramson et al., "Imitating interactive intelligence," CoRR, submitted on Dec. 10, 2020, arXiv:2012.05672v1, 96 pages.
Aulinas et al., "The slam problem: A survey," Proceedings of the 2008 conference on Artificial Intelligence Research and Development, Proceedings of the 11th International Conference of the Catalan Association for Artificial Intelligence, Jul. 2008, pp. 363-371.
Bailey et al., "Simultaneous localization and mapping (slam): part II," IEEE Robotics Automation Magazine, Sep. 2006, 13(3):108-117.
Burgess et al., "MONet: Unsupervised Scene Decomposition and Representation," CoRR, submitted on Jan. 22, 2019, arXiv:1901.11390v1, 22 pages.
Burri et al., "The EuRoC micro aerial vehicle datasets," International Journal of Robotics Research, Sep. 2016, 35(10):1157-1163.
Cadena et al., "Past, present, and future of simultaneous localization and mapping: Towards the robust-perception age," IEEE Transactions on Robotics, Dec. 2016, 32(6):1309-1332.
Crawford et al., "Exploiting spatial invariance for scalable unsupervised object tracking," CoRR, submitted on Nov. 20, 2019, arXiv:1911.09033v1, 15 pages.
Crawford et al., "Spatially invariant unsupervised object detection with convolutional neural networks," Proceedings of the Thirty-Third AAAI Conference on Artificial Intelligence, Jan. 2019, pp. 3412-3420.
Creswell et al., "Unsupervised object-based transition models for 3D partially observable environments," CoRR, submitted on Mar. 8, 2021, arXiv:2103.04693v1, 14 pages.
Denton et al., "Stochastic video generation with a learned prior," CoRR, submitted on Feb. 21, 2018, arXiv:1802.07687v1, 10 pages.
Denton et al., "Unsupervised learning of disentangled representations from video," Proceedings of the 31st International Conference on Neural Information Processing Systems, Dec. 2017, pp. 4417-4426.
Dosovitskiy et al., "An Image is Worth 16x16 Words: Transformers for Image Recognition at Scale," CoRR, submitted on Jun. 3, 2021, arXiv:2010.11929v2, 22 pages.
Du et al., "Neural radiance flow for 4D view synthesis and video processing," CoRR, submitted on Dec. 17, 2020, arXiv:2012.09790v1, 13 pages.
Durrant-Whyte et al., "Simultaneous localization and mapping: part I," IEEE Robotics & Automation Magazine, Jun. 2006, 13(2):99-110.
Engelcke et al., "Genesis: Generative scene inference and sampling with object-centric latent representations," Proceedings of International Conference on Learning Representations (ICLR), Dec. 2019, 17 pages.
Eslami et al., "Attend, infer, repeat: fast scene understanding with generative models," Proceedings of the 30th International Conference on Neural Information Processing Systems, Dec. 2016, pp. 3233-3241.
Eslami et. al., "Neural scene representation and rendering," Science, Jun. 15, 2018, 360(6394):1204-1210.
Geiger et al., "Are we ready for autonomous driving? the KITTI vision benchmark suite," Proceedings of the 2012 IEEE Conference on Computer Vision and Pattern Recognition (CVPR), Jun. 2012, pp. 3354-3361.
Geng et al., "Unsupervised Learning-Based Depth Estimation-Aided Visual SLAM Approach," Circuits, Systems, and Signal Processing, Feb. 2020, 39(2): 543-570.
Girdhar et al., "CATER: A diagnostic dataset for compositional actions & temporal reasoning," Proceedings of International Conference on Learning Representations (ICLR), Dec. 2019, 16 pages.
Greff et al., "Multi-object representation learning with iterative variational inference," Proceedings of the 36th International Conference on Machine Learning (PMLR), Jun. 2019, 97:2424-2433.
Greff et al., "On the binding problem in artificial neural networks," CoRR, submitted on Dec. 9, 2020, arXiv:2012.05208v1, 75 pages.
Handbook of Neural Computation, 1st edition, Samui (ed), Jul. 18, 2017, Chapter 20, 11 pages.
Hasson et al., "Leveraging photometric consistency over time for sparsely supervised hand-object reconstruction," Proceedings of the IEEE/CVF Conference on Computer Vision and Pattern Recognition (CVPR), Jun. 2020, pp. 571-580.
International Preliminary Report on Patentability in International Appln. No. PCT/EP2022/064484, dated Dec. 7, 2023, 13 pages.
International Search Report and Written Opinion in International Appln. No. PCT/EP2022/064484, dated Oct. 11, 2022, 19 pages.
Ionescu et al., "Object-Centric auto-encoders and dummy anomalies for abnormal event detection in video," 2019 IEEE/CVF Conference on Computer Vision and Pattern Recognition, Jun. 15, 2019, pp. 7834-7843.
JeremyJordan.me "Variational autoencoders," Mar. 19, 2018, retrieved on Sep. 27, 2022, retrieved from URL<https://www.jeremyjordan.me/variational-autoencoders/>, 15 pages.
Jiang et al., "SCALOR: Generative world models with scalable object representations," CoRR, submitted on Mar. 4, 2020, arXiv:1910.02384v4, 22 pages.
Kingma et al., "An introduction to variational autoencoders," CoRR, submitted on Dec. 11, 2019, arXiv:1906.02691v3, 89 pages.
Kingma et al., "Auto-Encoding Variational Bayes," CoRR, submitted on Dec. 10, 2022, arXiv:1312.6114v11, 14 pages.
Kosiorek et al., "NeRF-VAE: A Geometry Aware 3D Scene Generative Model," CoRR, submitted on Apr. 1, 2021, arXiv:2104.00587v1, 17 pages.
Kosiorek et al., "Sequential attend, infer, repeat: Generative modelling of moving objects," Proceedings of the 32nd International Conference on Neural Information Processing Systems, Dec. 2018, pp. 8615-8625.
Li et al., "DeepSLAM: A Robust Monocular SLAM System With Unsupervised Deep Learning," IEEE Transactions on Industrial Electronics, Apr. 2021, 68(4):3577-3587.
Li et al., "Disentangled sequential autoencoder," Proceedings of the 35th International Conference on Machine Learning (PMLR), Jul. 2018, 80:5670-5679.

(56)         References Cited

OTHER PUBLICATIONS

Li et al., "Neural scene flow fields for Space-Time view synthesis of dynamic scenes," CoRR, submitted on Nov. 26, 2020, arXiv:2011.13084v1, 11 pages.

Lin et al., "BARF: Bundle-Adjusting neural radiance fields," CoRR, submitted on Apr. 13, 2021, arXiv:2104.06405v1, 15 pages.

Lin et al., "SPACE: Unsupervised object-oriented scene representation via spatial attention and decomposition," Proceedings of International Conference on Learning Representations (ICLR), Dec. 2019, 22 pages.

Liu et al., "Hierarchically learned view-invariant representations for cross-view action recognition," IEEE Transactions on Circuits and Systems for Video Technology, Aug. 2019, 29(8): 2416-2430.

Liu et al., "View-invariant, occlusion-robust probabilistic embedding for human pose," CoRR, submitted on Oct. 23, 2020, arXiv:2010.13321v1, 23 pages.

Locatello et al., "Object-Centric Learning with Slot Attention," CoRR, submitted on Oct. 14, 2020, arXiv:2006.15055v2, 27 pages.

Mildenhall et al., "NeRF: Representing Scenes as Neural Radiance Fields for View Synthesis," CoRR, submitted on Aug. 3, 2020, arXiv:2003.08934v2, 25 pages.

Nguyen-Ha et al., "Sequential view synthesis with transformer," 15th Asian Conference on Computer Vision, Nov. 30-Dec. 4, 2020, pp. 695-711.

Niemeyer et al., "Giraffe: Representing scenes as compositional generative neural feature fields," CoRR, submitted on Nov. 24, 2020, arXiv:2011.12100v1, 12 pages.

Parameswaran et al., "View invariance for human action recognition," International Journal of Computer Vision, Jan. 2006, 66(1):83-101.

Park et al., "Nerfies: Deformable neural radiance fields," CoRR, submitted on May 11, 2021, arXiv:2011.12948v3, 17 pages.

Pumarola et al., "D-NeRF: Neural radiance fields for dynamic scenes," CoRR, submitted on Nov. 27, 2020, arXiv:2011.13961v1, 10 pages.

Rezende et al., "Taming vaes," CoRR, submitted on Oct. 1, 2018, arXiv:1810.00597v1, 21 pages.

Sitzmann et al., "Scene representation networks: Continuous 3D-Structure-Aware neural scene representations," Proceedings of the 33rd International Conference on Neural Information Processing Systems, Dec. 2019, pp. 1121-1132.

Sturm et al., "A Benchmark for the Evaluation of RGB-D SLAM Systems," Proceedings of the 2012 IEEE/RSJ International Conference on Intelligent Robots and Systems (IROS), Oct. 2012, 8 pages.

Sun et al., "View-invariant probabilistic embedding for human pose," Proceedings of European Conference on Computer Vision (ECCV), Aug. 2020, pp. 53-70.

Trevithick et al., "GRF: Learning a general radiance field for 3D scene representation and rendering," CoRR, submitted on Oct. 9, 2020, arXiv:2010.04595v1, 23 pages.

Vaswani et al., "Attention is all you need," Proceedings of Advances in Neural Information Processing Systems 30 (NIPS 2017), Dec. 2017, 11 pages.

Veerapaneni et al., "Entity abstraction in visual model-based reinforcement learning," Proceedings of the Conference on Robot Learning (PMLR), Nov. 2019, 100:1439-1456.

Villegas et al., "Decomposing motion and content for natural video sequence prediction," Proceedings of 5th International Conference on Learning Representations, Apr. 24-26, 2017, 22 pages.

Wang et al., "NeRF—: Neural radiance 368 fields without known camera parameters," CoRR, submitted on Feb. 14, 2021, arXiv:2102.07064v1, 10 pages.

Xu et al., "MID-Fusion: Octree-based object-level multi-instance dynamic SLAM," Proceedings of 2019 International Conference on Robotics and Automation (ICRA), May 2019, pp. 5231-5237.

Yu et al., "pixelNeRF: Neural radiance fields from one or few images," CoRR, submitted on Dec. 3, 2020, arXiv:2012.02190v1, 20 pages.

Zablotskaia et al., "Unsupervised video decomposition using spatio-temporal iterative inference," CoRR, submitted on Jun. 25, 2020, arXiv:2006.14727v1, 15 pages.

Zhu et al., "S3VAE: Self-supervised sequential VAE for representation disentanglement and data generation," Proceedings of the IEEE/CVF Conference on Computer Vision and Pattern Recognition (CVPR), Jun. 2020, pp. 6538-6547.

Liu, "Study on Video Frame Prediction Algorithms Computer Knowledge and Technology," Computer Knowledge and Technology, Apr. 2021, 17(10):249-252 (with English abstract).

Notice of Allowance in Chinese Appln. No. 202280032841.3, mailed on Jan. 12, 2026, 10 pages (with machine translation).

Office Action in Chinese Appln. No. 202280032841.3, mailed Sep. 6, 2025, 22 pages (with English translation).

Office Action in Japanese Appln. No. 2025-002273, mailed on Dec. 9, 2025, 13 pages (with English summary).

* cited by examiner

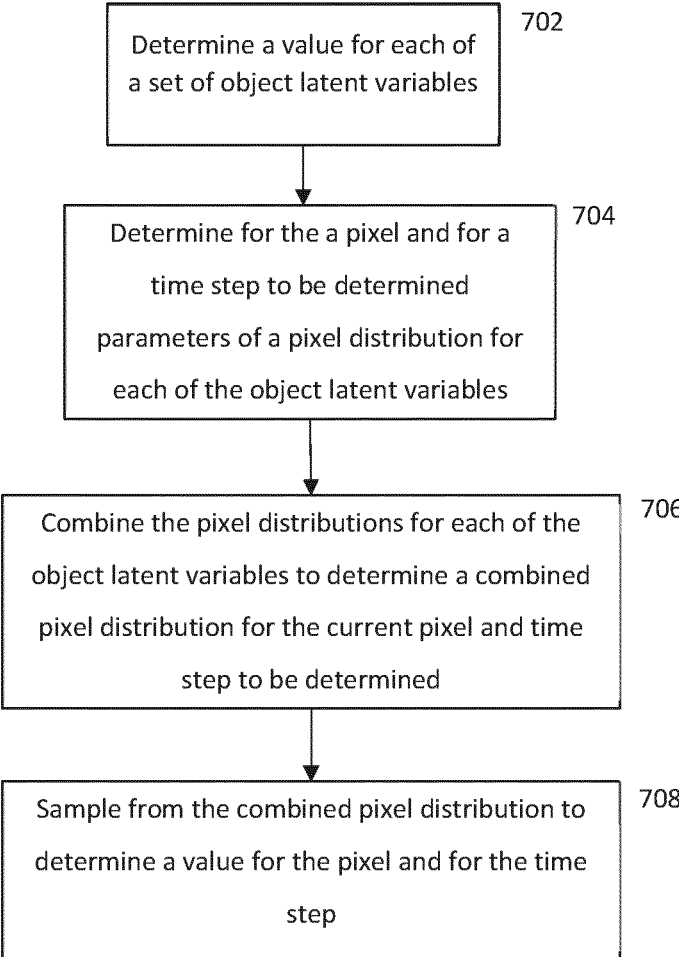

Determine a value for each of
a set of object latent variables          702

Determine for the a pixel and for a
time step to be determined
parameters of a pixel distribution for
each of the object latent variables          704

Combine the pixel distributions for each of the
object latent variables to determine a combined
pixel distribution for the current pixel and time
step to be determined          706

Sample from the combined pixel distribution to
determine a value for the pixel and for the time
step          708

FIG. 7

UNSUPERVISED LEARNING OF OBJECT REPRESENTATIONS FROM VIDEO SEQUENCES USING ATTENTION OVER SPACE AND TIME

CROSS-REFERENCE TO RELATED APPLICATION

This application is a National Stage Application under 35 U.S.C. § 371 and claims the benefit of International Application No. PCT/EP2022/064484, filed May 27, 2022, which claims priority to U.S. Application No. 63,194,849, filed May 28, 2021, the disclosure of which is incorporated herein by reference.

BACKGROUND

This specification relates to training a machine learning model to characterize objects in video frames as well as global time-varying elements such as viewpoint.

Machine learning models receive an input and generate an output, e.g., a predicted output, based on the received input and on values of the parameters of the model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a system, and method, implemented as one or more computer programs on one or more computers in one or more physical locations that trains a video object representation neural network system. An encoder part of the trained system may be used to determine properties of multiple different objects in a video sequence, or to determine the position of a viewpoint for the video sequence, or both. A decoder part of the trained system may be used to generate a new video sequence. Together the encoder and decoder may be used to modify a video sequence.

In one aspect there is provided a computer-implemented method of training a video object representation neural network system. The video object representation neural network system includes a self-attention neural network comprising one or more self-attention layers, e.g. transformer neural network layers, each configured to apply a self-attention mechanism over a layer input, and having a plurality of self-attention neural network parameters.

The method comprises obtaining a video sequence comprising a sequence of T image frames, one at each of a succession of times, and processing each of the image frames to generate a set of S spatial encodings for each of the T image frames. The method thereby obtains a group of S×T spatial encodings for the video sequence. Each spatial encoding comprises an encoding of a respective region or patch of the image frame. The video may be obtained for example from a camera or a LIDAR sensor, i.e. an image frame may comprise a point cloud.

The method further comprises processing the group of S×T spatial encodings using the attention neural network, in particular by applying the self-attention mechanism over a layer input comprising the group of S×T spatial encodings to generate, optionally after further self-attention processing steps, a group of transformed spatial encodings. Each of the transformed spatial encodings corresponds to an image frame time and to an image frame region. The group of transformed spatial encodings may have the same or different e.g. lower resolution i.e. there may be S×T or fewer transformed spatial encodings. In implementations applying the self-attention mechanism over the layer input includes applying the self-attention mechanism over the spatial encodings of different image frames i.e. over image frames from different times of the succession of times.

The method further comprises determining, for each of a set of object latent variables, typically vectors, one or more values parameterizing an object latent distribution of the object latent variable, e.g. a mean or standard deviation (or variance) of a distribution. This is done by aggregating the group of transformed spatial encodings over times of the image frames. The method may also determine, for each of a set of frame latent variables, one or more values parameterizing a frame latent distribution of the frame latent variable, by aggregating the group of transformed spatial encodings over regions of the image frames. The method determines a value for each of the set of object latent variables by sampling from the object latent distribution for the object latent variable. The method may also determine a value for each of the set of frame latent variables by sampling from the frame latent distribution for the frame latent variable.

The method processes the determined values of the object latent variables (and may process determined values of determined frame latent variables) to generate a decoded sequence of image frames. There are many types of decoder which are capable of generating an image from a set of latent variables and any of these may be used. An example decoder is described later.

The method may then comprise training the system by adjusting at least values of the self-attention neural network parameters to optimize an objective function dependent on i) a measure of a difference between the sequence of T image frames and the decoded sequence of image frames, ii) a difference between each of the object latent distributions and a prior object latent distribution. Where determined, the objective function may be optimized dependent on iii) a difference between each of the frame latent distributions and a prior frame latent distribution. The prior object latent distribution and the prior frame latent distribution may be the same distribution e.g. a unit Gaussian.

Implementations of the above described method provide a trained video object representation neural network system. In some applications once trained only an encoder part of the system may be needed i.e. a part of the system from a video sequence input to a part configured to determine the object and (optionally) frame latent distribution, optionally including a part configured to sample from these distributions (in other implementations information may be derived e.g. from a mean of these distributions). In some applications once trained only a trained decoder part of the system may be needed, as described later, e.g. to generate video sequences of 2D or 3D images.

Implementations of the trained system provide object information in the set of object latent variables. For example in implementations these may be substantially disentangled i.e. so that different object latent variables correspond to different factors of variation of objects in the scene and their properties such as size, color, position e.g. in each dimension, and motion. Similarly in implementations different frame latent variables may disentangle different global properties of frames of the video sequence such as viewpoint position e.g. in each dimension. Further advantages of the methods and systems are described later.

In implementations each spatial encoding comprises a feature map, i.e. a map of visual features, of the respective region or "patch" of the image frame. Processing an image frame to generate a set of spatial encodings may use a feature extraction neural network, e.g. a convolutional neural network, with a plurality of feature extraction neural network parameters, to generate the feature map for each region of the image frame. Training the system may include adjusting values of the feature extraction neural network parameters.

In implementations the determined values of the object latent variables (and optionally of the frame latent variables) are processed using an image frame decoder neural network having a plurality of image frame decoder neural network parameters to generate the decoded sequence of image frames. Training the system may then include adjusting values of the image frame decoder neural network parameters.

In some implementations the decoded sequence of image frames comprises an image frame for each of a succession of decoded image frame time steps. Generating the decoded sequence of image frames uses the image frame decoder neural network to generate, for each decoded image frame pixel and for each decoded image frame time step, parameters of a pixel distribution for each of the object latent variables. In particular the image frame decoder neural network processes the determined values of the object (and optionally frame latent variables), as well as information specifying the location of a pixel and information specifying the time step, to determine parameters of the pixel distribution ($\mu$) for each of the object latent variables. The pixel distributions for each of the object latent variables are then combined to determine a combined pixel distribution. This is then sampled to determine a value for the pixel and for the time step. For example in one implementation a frame latent variable (for a decoding an image frame) is concatenated with each of the object latent variables to provide an input, more particularly a set of inputs, to the image frame decoder neural network.

Generating the decoded sequence of image frames may include determining a mixing weight for each of the object latent variables, for each pixel and for each time step. The pixel distributions for each of the object latent variables may then be combined according to the respective mixing weights, optionally normalized. In such implementations the per pixel mixing weight for each object latent variable provides a soft segmentation mask for an object corresponding to the object latent variable e.g. to segment each image frame into regions representing the different objects in the image frame.

Any suitable measure of the difference between the sequence of image frames and the decoded sequence of image frames may be used e.g. a cross-entropy loss, a squared error loss, or a Huber loss. Any suitable measure may be used for the difference between the distributions e.g. a KL or Jensen-Shannon divergence or another measure of a distance between distributions.

In some implementations the method may include obtaining a conditioning input defining one or more objects or object properties for one or more objects in the video sequence, or defining a viewpoint position or orientation e.g. pose. The conditioning input may be provided to the self-attention neural network and to the image frame decoder neural network during the training. In this way the system may be trained e.g. to generate video image sequences conditional on a conditioning input that defines objects or properties of objects to be included in the generated video image sequence, or an optionally changing viewpoint for the generated video sequence.

As previously described, the self-attention layers may be transformer neural network layers. The application of the transformer neural network architecture to computer vision is described in arXiv:2010.11929.

In implementations, processing the group of S×T spatial encodings using the attention neural network may include adding a positional information to each of the S×T spatial encodings that defines the respective region of the image frame and the image frame time. The positional information may comprise, for example, a positional embedding i.e. an embedding of the image frame region and time. The embedding may comprise a vector of the same dimensionality as the spatial encodings; it may be added to the respective spatial encoding. The embeddings may be learned or predefined.

In implementations processing the group of S×T spatial encodings using the attention neural network comprises processing the layer input comprising the group of S×T spatial encodings using one of the one or more self-attention layers to generate a query and a key-value pair for each of the spatial encodings. The self-attention mechanism may then be used to apply, e.g. each of, the queries to, e.g. each of, the keys, more particularly key-value pairs, to determine the group of transformed spatial encodings. The self-attention may comprise masked self-attention, in which case not all of the queries may be applied. The self-attention mechanism may be a multi-headed attention mechanism. In implementations the self-attention neural network parameters comprise parameters of learned transformations applied to the layer input to generate the queries and key-value pairs.

In general an attention mechanism maps a query and a set of key-value pairs to an output, where the query, keys, and values are all vectors. The output is computed as a weighted sum of the values, where the weight assigned to each value is computed by a compatibility function of the query with the corresponding key. The exact self-attention mechanism applied depends on the configuration of the attention neural network. For example each attention layer can apply a dot-product attention mechanism e.g. a scaled dot-product attention mechanism. In scaled dot-product attention, for a given query, the attention layer computes the dot products of the query with all of the keys, divides each of the dot products by a scaling factor, e.g., by the square root of the dimensions of the queries and keys, and then applies a softmax function over the scaled dot products to obtain the weights on the values. The attention layer then computes a weighted sum of the values in accordance with these weights.

In some implementations processing the group of S×T spatial encodings using the attention neural network comprises providing the group of S×T spatial encodings as the later input to a first self-attention layer of the attention neural network to generate a first self-attention layer output, and providing first self-attention layer output to a second self-attention layer of the attention neural network to generate the group of transformed spatial encodings. In implementations this includes reducing the number of spatial encodings from S×T spatial encodings to K×T spatial encodings, where K<S is the number object latent variables. Thus implementations may more feature maps than there are object latents, or the same number. Such reducing may be done after the first or after the second self-attention layer, e.g. by pooling in a horizontal and/or vertical direction (of a tiling of the patches), and optionally normalizing.

In another aspect there is provided a computer-implemented video processing neural network system, comprising a (trained) feature extraction neural network configured to receive a video sequence comprising a sequence of T image frames, one at each of a succession of times, and process each of the image frames to generate a set of S spatial encodings for each of the T image frames thereby to obtain a group of S×T spatial encodings for the video sequence. Each spatial encoding may comprise an encoding of a respective region of the image frame.

The computer-implemented video processing neural network system also comprises a (trained) self-attention neural network comprising one or more self-attention layers, each configured to apply a self-attention mechanism over a layer input. In implementations the self-attention neural network is configured to processes the group of S×T spatial encodings using the attention neural network by applying the self-attention mechanism over a layer input comprising the group of S×T spatial encodings to generate a group of transformed spatial encodings each corresponding to an image frame time and to an image frame region. Applying the self-attention mechanism over the layer input includes applying the self-attention mechanism over the spatial encodings of different image frames.

The video processing neural network system is configured to determine, for each of a set of object latent variables, one or more values parameterizing an object latent distribution of the object latent variable, by aggregating the group of transformed spatial encodings over times of the image frames, and optionally to a value for each of the set of object latent variables by sampling from the object latent distribution for the object latent variable.

The video processing neural network system may also be configured to determine, for each of a set of frame latent variables, one or more values parameterizing a frame latent distribution of the frame latent variable, by aggregating the group of transformed spatial encodings over regions of the image frames, and optionally determine a value for each of the set of frame latent variables by sampling from the frame latent distribution for the frame latent variable.

The video processing neural network system is also configured to determine i) one or more properties of one or more objects depicted in the video sequence from the values parameterizing the object latent distributions i.e. from the object latent variables or from the values parameterizing the object latent distributions; ii) a position or orientation of a viewpoint for the video sequence from the values parameterizing the frame latent distributions, i.e. from the frame latent variables or from the values parameterizing the frame latent distributions; or both.

In another aspect there is provided a computer-implemented video generation neural network system, configured to determine a value for each of a set of object latent variables by sampling from a respective prior object latent distribution for the object latent variable, (and optionally determine a value for each of a set of frame latent variables by sampling from a respective prior frame latent distribution for the frame latent variable).

The system comprises a (trained) image frame decoder neural network to process the determined values of the object latent variables (and optionally determined values of frame latent variables) to generate a video sequence comprising a sequence of generated image frames at successive time steps. The image frame decoder neural network configured to, for each pixel of each generated image frame and for each generated image frame time step: process the determined values of the object latent variables (and optionally the determined values of the frame latent variables), information specifying a location of the pixel, and information specifying the time step to determine, for the pixel and for the time step, parameters of a pixel distribution for each of the object latent variables; combine the pixel distributions for each of the object latent variables to determine a combined pixel distribution; and sample from the combined pixel distribution to determine a value for the pixel and for the time step.

Particular embodiments of the subject matter described in this specification can be implemented so as to realize one or more of the following advantages.

The video object representation neural network system, in particular an encoder part of the system including the feature extraction neural network and the self-attention neural network, can process a video sequence of a 3D scene and disentangle and identify, i.e. characterize, multiple objects simultaneously. The system is able to do this even when the viewpoint, e.g. camera pose, is changing without explicitly being given information about the viewpoint or camera pose. Implementations of the system can process scenes with many objects and complex backgrounds.

Thus the system is able to determine a representation i.e. the set of object latent variables or their distributions, that is allocentric, which is important for many tasks. For example a system which is unaware of the viewpoint can conflate an object's distance from the viewpoint and its size; embodiments of the system can overcome this problem.

In embodiments of the system the set of object latent variables, or their distributions, provide a stable representation of the objects in a scene with respect to camera pose. In implementations of the system this is achieved using attention over space and time, across different image frames of the video sequence, in combination with a factorized latent space that imposes a separation of static, i.e. substantially time-invariant, object attributes from global or dynamic properties of the video sequence such as camera pose. This also allows the system to determine static object motion characteristics, such as object trajectory summaries.

The system also determines a representation of global, potentially time-varying, scene properties such as viewpoint in the set of frame latent variables, or their distributions. The ability to determine viewpoint allows the system to be used to determine a location e.g. of a mobile mechanical agent equipped with a camera or other video capture device.

Some implementations of the system also have a simpler architecture than some previous systems which are, however, less capable.

Implementations of the system can also be used to generate video sequences, for example as of an existing scene as if from a particular viewpoint, or of a new or modified scene containing one or more objects. This can be done by determining values for the latent variables, e.g. from an existing scene or by sampling them from a prior distribution, and then providing them to the video object representation neural network system, in particular an decoder part of the system. This can be used, for example, for viewpoint interpolation or extrapolation, or for planning e.g. when controlling a mechanical agent such as a robot to perform a task. Unlike some previous systems which can do this for a specific scene on which they have previously been trained, embodiments of the system can be trained on different scenes and then do this for a new, previously unseen scene.

For example, an encoder of the untrained or trained video object representation neural network system can be used in a reinforcement learning system that controls an agent to perform a task, as well as or instead of images from an environment in which the agent operates, to allow the reinforcement learning system to learn faster or more effectively. Or a decoder of the untrained or trained video object representation neural network system can be used a model-based reinforcement learning system to predict a future state of the environment when learning an action selection policy for controlling the agent.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is a flow diagram of a process for generating a sequence of images using a trained decoder part of the video object representation neural network system.

Like reference numbers and designations in the various drawings indicate like elements.

DETAILED DESCRIPTION

Figure 1:
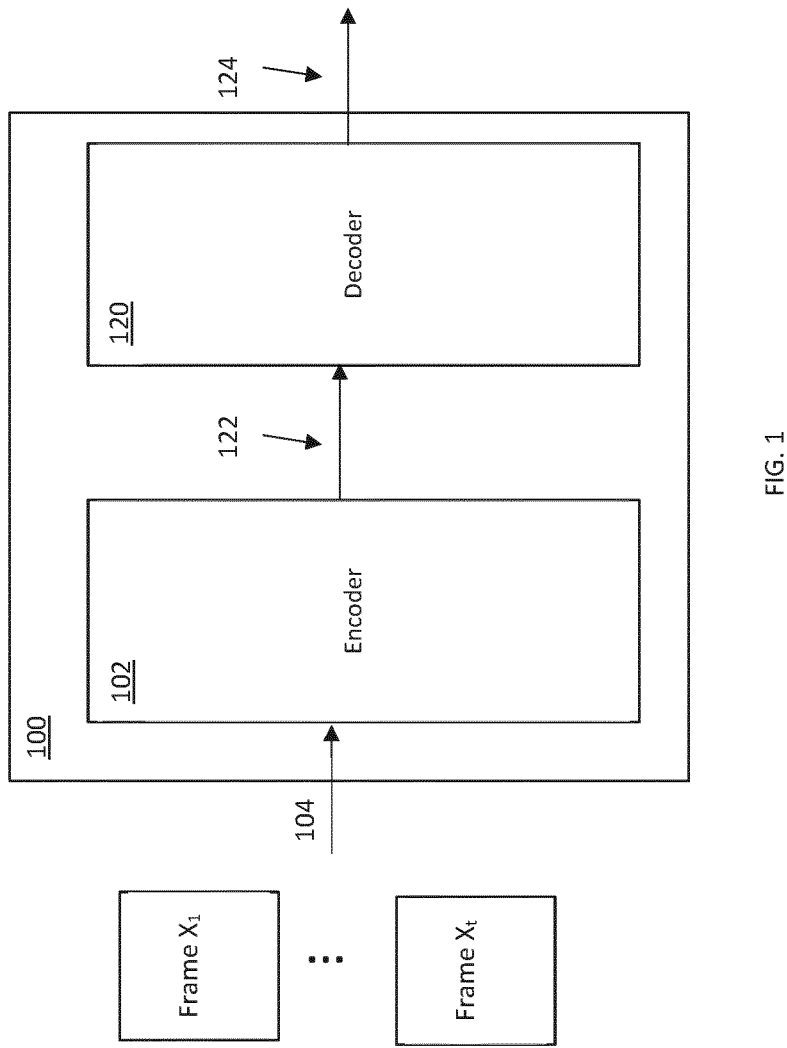
FIG. 1 shows an video object representation neural network system.
Figure 2:
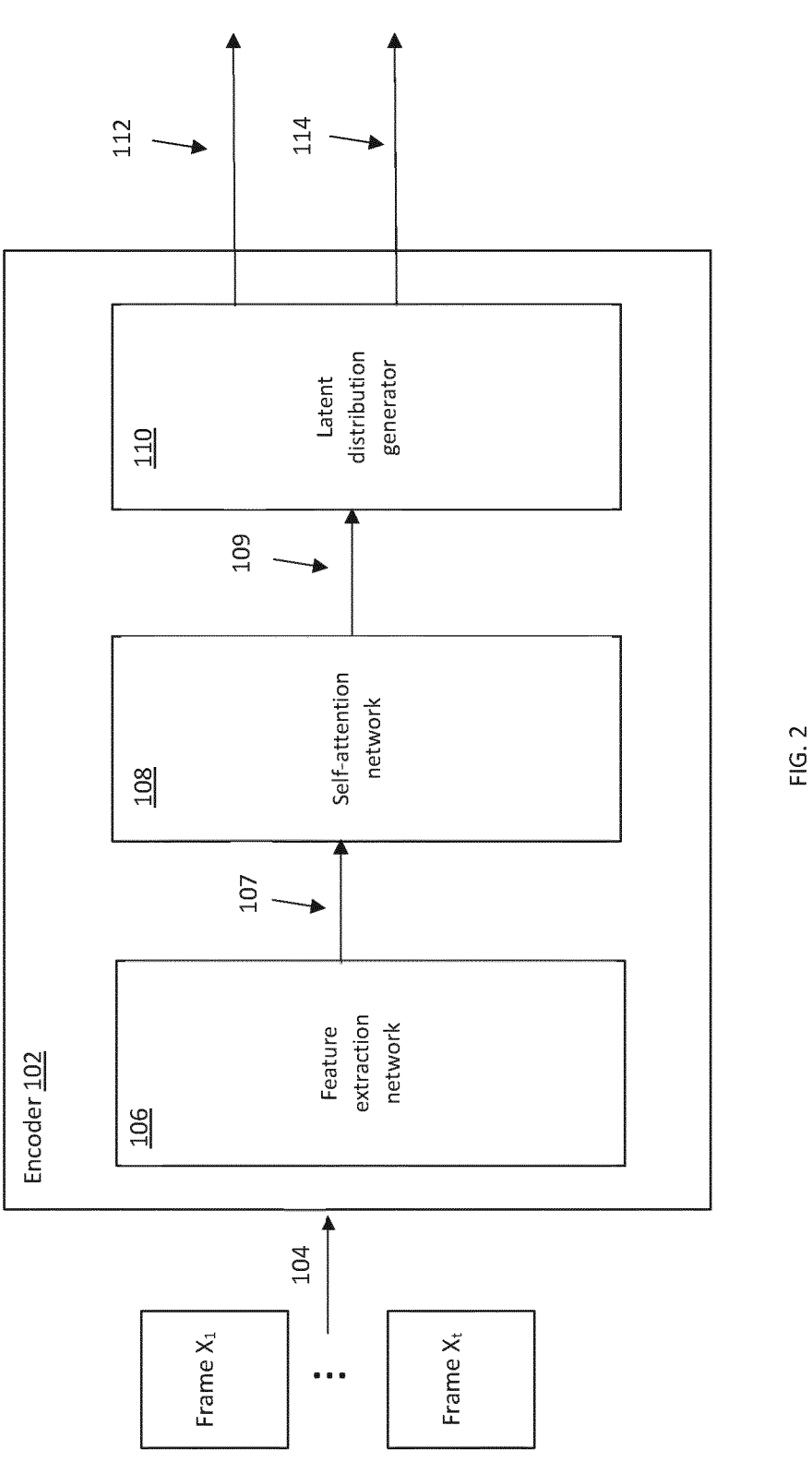
FIG. 2 shows an encoder neural network of the video object representation neural network system.

FIG. 1 schematically shows a video object representation neural network system 100 that may be implemented by one or more computers in one or more locations. The video object representation neural network system 100 comprises an inference network (encoder 102) trained to infer latent variables from an input sequence of images (frames, having dimensions H×W pixels) and a generative model (decoder 120) trained to decode latent variables generated by the encoder 102 to generate pixel values (i.e. images). The encoder 102 uses spatio-temporal attention-based inference that allows for stable object tracking. The decoder 120 is able to combine object latent variables of a given sequence with frame latent variables of a different sequence to generate a consistent rendering of the same scene content (i.e. objects and their properties, relative rearrangements, and segmentation assignments) from entirely different viewpoints.

In particular, the encoder 102 is trained to process an input image sequence and to generate a set of K object (or slot) latent variables $O:=\{o_k\}_{k=1}^{K}$ representing content depicted in the image sequence. In implementations, the object latent variables are invariant across all frames in the input 104.

That is, their distribution is constant through time, and is expected to summarize information across the whole sequence.

The encoder 102 also outputs a set of T frame latent variables $F:=\{f_t\}_{t=1}^{T}$, containing a frame latent variable for each frame, t, in the input sequence. The frame latent variables represent time-varying global content/view content across the input image sequence. Importantly, the encoder 102 decomposes and factorizes a scene sequence into the object latent variables and frame latent variables without supervision.

By factorizing the latent space into K object latent variables and T frame latent variables, the number of latent variables required to represent the video sequence can be reduced from K·T to K+T. A prior for the latent variables can assume independence between object latent variables, frame latent variables, and feature dimensions; for example it may be defined as $p(O, F)=\Pi_k \mathcal{N} (o_k|O, I)\Pi_t \mathcal{N} (f_t|O, I)$ where $\mathcal{N} (O, I)$ denotes a unit Gaussian.

The encoder 102 receives as input 104 a sequence X of T image frames $x_1$-$x_t$ (each having dimensions H×W pixels). The sequence may be a sequence of images of a scene taken from multiple viewpoints. As described above, the input 104 is processed to determine corresponding object (or slot) latent variables O and frame latent variables F. A Gaussian approximate posterior, q(O, F|X), is parameterized as the output of the encoder 104, $\varepsilon_\phi(X)$ (where $\phi$ denotes the parameters of the encoder), which output values defining the mean and variance (e.g. standard deviation), e.g. on a log-scale, for all latent variables given the input sequence 104.

In more detail, the sequence of frames 104 is processed to obtain an output 107 comprising a set of S spatial encodings for each of the T image frames. Each of the S spatial encodings in the output 107 is associated with a particular image frame x and is an encoding of a respective region of the image frame. S may be equal to H×W. That is each region may be an individual pixel.

For example, processing the sequence of frames 104 to generate the set of S spatial encodings for each of the T image frames may comprise processing each of the image frames by a feature extraction neural network 106 having a plurality of feature extraction neural network parameters and trained to receive an image frame as input and to provide as output the set of S spatial encodings for that image frame. For example, the feature extraction neural network 106 may comprise a convolutional neural network having one or more convolutional neural network layers trained to output S spatial feature maps at each time-step. Each feature map may contain C channels. S may be larger than the number of object latent variables K.

The output 107 of S×T spatial encodings is provided as input to a self-attention neural network 108 comprising one or more self-attention layers. The attention neural network 108 is trained to process the group of S×T spatial encodings by applying a self-attention mechanism to generate an output 109 comprising a group of K transformed spatial encodings. For example, the group of S×T spatial encodings may be provided as an input to a first layer of the one or more self-attention layers as a layer input and processed by that layer to generate a query and a key-value pair for each of the spatial encodings. The self-attention mechanism may then apply the queries to the key-value pairs to determine the group of transformed spatial encodings. It will be appreciated that the self-attention neural network parameters are parameters of learned transformations applied to the layer input to generate the queries and key-value pairs.

Each transformed spatial encoding corresponds to an image frame time/and to an image frame region. The output 109 of the attention neural network 108 may be denoted $\hat{e}_{t,k}$.

The output 109 is provided to a latent distribution generator 110. The latent distribution generator 110 is configured to aggregate the output 109 along separate axes to obtain T frame and K object posterior parameters. In particular, for each of the set of K object latent variables O, one or more values parameterizing an object latent distribution of the object latent variable is determined by aggregating the outputs 109 of the attention neural network 108 over times of the image frames. Similarly, for each of the set of T frame latent variables F, one or more values parameterizing a frame latent distribution of the frame latent variable is determined by aggregating the outputs 109 of the attention neural network 108 over regions of the image frames.

The distribution generator may comprise one or more neural networks, such as multi-layer perceptrons (MLPs). For example, a first MLP $mlp_o$ may be trained to process the output 109 to receive as input the outputs 109 aggregated over times of the image and to output the object latent distribution, $$\lambda_{o,k} = mlp_o\left(\frac{1}{T\sum_t \hat{e}_{t,k}}\right).$$

Similarly, a second MLP $mlp_f$ may be trained to process the output 109 to receive as input the outputs 109 aggregated over regions of the image and to output the frame latent distribution, $$\lambda_{f,t} = mlp_o\left(\frac{1}{K\sum_k \hat{e}_{t,k}}\right).$$

The latent distribution generator 110 is configured to determine a value for each of the set of object latent variables by sampling from the object latent distribution for the object latent variable and to generate an output 112 comprising the set of K object latent variables, $o_k \sim \mathcal{N}(\lambda_{o,k}{}^\mu, \exp(A_{o,k}{}^\sigma)\mathbb{1})$ where $\lambda_{o,k}\mu$, denotes object latent means and $\lambda_{o,k}\sigma$ denotes object latent standard deviations. The latent distribution generator 110 is also configured to determine a value for each of the set of frame object variables by sampling from the frame latent distribution for the frame latent variable and to generate an output 114 comprising the set of T object latent variables, $f_t \sim \mathcal{N}(\lambda_{f,t}{}^\mu, \exp(\lambda_{f,t}{}^\sigma)\mathbb{1})$ where $A_{f,t}{}^\mu$, denotes frame latent means and $\lambda_{f,t}{}^\sigma$ denotes frame latent standard deviations.

The attention neural network 108 may comprise a first one or more self-attention layers $T_1$ and a second one or more self-attention layers $T_2$. The first one or more self-attention layers $T_1$ and second one or more self-attention layers $T_2$ may comprise transformer neural network subsystems. In general a transformer network subsystem may be a subsystem characterized by having a succession of self-attention neural network layers. A self-attention neural network layer has an attention layer input for each element of the input and is configured to apply an attention mechanism over the attention layer input to generate an attention layer output for each element of the input. There are many different attention mechanisms that may be used.

Generally, the attention layers are configured to: apply a learned query linear transformation to each hidden state at each input position in the current input sequence to generate a respective query for each input position, apply a learned key linear transformation to (i) each hidden state at each input position and to (ii) each hidden state at each slot within the episodic and compressed memories to generate a respective key for each input position and for each memory slot, and apply a learned value linear transformation to (i) each hidden state at each input position and to (ii) each hidden state at each slot within the episodic and compressed memories to generate a respective value for each input position and for each memory slot. The attention layers in then apply the attention mechanism described above using these queries, keys, and values to determine the output sequence for the layer input sequence. The output sequence generally includes a respective attended vector for each hidden state input at each input position. In general, the queries, keys, and values are all vectors. As used in this specification, the term "learned" means that an operation or a value has been adjusted during the training of the system, e.g. by back-propagation of gradients of an objective function In some implementations, to allow an attention layer to jointly attend to information from different representation subspaces at different positions, the attention layer employs multi-head attention.

To implement multi-ahead attention, the attention layer applies h different attention mechanisms in parallel. In other words, the attention layer includes h different attention sub-layers, with each attention sub-layer within the same attention layer receiving the same original queries, original keys, and original values.

Each attention sub-layer is configured to transform the original queries, and keys, and values using learned linear transformations and then apply the attention mechanism to the transformed queries, keys, and values. Each attention sub-layer will generally learn different transformations from each other attention sub-layer in the same attention layer.

In particular, each attention sub-layer is configured to apply a learned query linear transformation to each original query to generate a layer-specific query for each original query, apply a learned key linear transformation to each original key to generate a layer-specific key for each original key, and apply a learned value linear transformation to each original value to generate a layer-specific values for each original value. The attention sub-layer then applies the attention mechanism described above using these layer-specific queries, keys, and values to generate initial outputs for the attention sub-layer.

$T_1$ may receive as input the S×T spatial encodings and output S×T transformed spatial encodings. Each of the S×T spatial encodings attends to all others of the S×T spatial encodings. If S×T is greater than K, the S×T transformed spatial encodings may be reduced to K×T transformed spatial encodings. For example, the S×T transformed spatial encodings output from $T_1$ may be input to a pooling layer that performs pooling operation over the output. The output of $T_1$ (or the reduced output) is provided as input to 72 which is trained to output 109. The output of $T_2$ may comprise the same number of slots as are input to $T_2$. For example, if the output of $T_1$ comprises S slots prior to pooling, and K slots after pooling, the output of $T_2$ may comprise K slots.

Each of $T_1$ and 72 may use absolute positional embeddings. The positional embeddings may be three-dimensional to denote the spatio-temporal position of each slot. In an alternative implementation, $T_1$ and $T_2$ may use relative positional embeddings.

The decoder 120 comprises a plurality of decoder neural network parameters and is trained to process an input comprising object latent variables O and frame latent variables F and to produce as output a generated image sequence.

Images are decoded/generated by "querying" the decoder 120. The decoder 120 receives an input 122 comprising object latent variables and frame latent variables (for example the sampled latent variables 112, 114) and processes the input 122 to generate an output 124 comprising a generated a decoded sequence of image frames for one or more time steps. For example, the output 124 may comprise an image frame for each of a succession of decoded image frame time steps.

There are many types of decoder which are capable of generating an image from a set of latent variables and any of these may be used. In an example, the decoder 120 is a neural network and may be a multi-layer perceptron or a convolutional neural network. In addition to the object and frame latent variables, the input 122 may further comprise a region of the image to be generated and the time-step being decoded.

The region decoded may be, for example, an individual pixel. Decoding the sequence of image frames may comprise, for each pixel of each decoded image frame, and for each decoded image frame time step, the decoder processing an input comprising values of object latent variables, values of frame latent variables, information specifying a location of the pixel, and information specifying the time step. The decoder determines for the pixel and for the time step parameters of a pixel distribution of each of the object latent variables in the input. The decoder may further combine the pixel distributions for each of the object latent variables to determine a combined pixel distribution and may sample from the combined pixel distribution to determine a value for the pixel and for the time step.

For example, each pixel may be modeled as a Gaussian mixture model with K components. If it is assumed that all regions and all frames are independent, the mixture weights for any RGB pixel $x_{t,i}(1 \leq i \leq HW)$ may capture which object k "explains" that pixel. The corresponding mixing weights $\hat{m}_{k,t,i}$, and pixel reconstructions means $\mu_{k,t,i}$ may be computed for every slot k at a specific time-step t and specific pixel location $l_i$ using the decoder 120.

$$\hat{m}_{k,t,i}, \mu_{k,t,i} = \mathcal{D}_\theta(o_k, f_t; l_i, t) \tag{1}$$

By constraining the decoder 120 to work on individual pixels, this may advantageously save memory and computation, using a subset of pixels as training targets as opposed to full images. Once the pixels are decoded, the mixing weights $\hat{m}_{k,t,i}$ may be obtained, for example by taking the softmax of the mask logits across the K slots $\hat{m}_{k,t,i} = \text{softmax}_k (\hat{m}_{k,t,i})$.

$$P(x_{t,i}|o_1, \dots, o_k, f_t; t, l_i = \sum_k \hat{m}_{k,t,i} N(x_{t,i}|\mu_{k,t,i}; \sigma_x) \tag{2}$$

Equation (2) specifies the full pixel likelihood, where ox is a scalar hyperparameter.

Figures 3, 4:
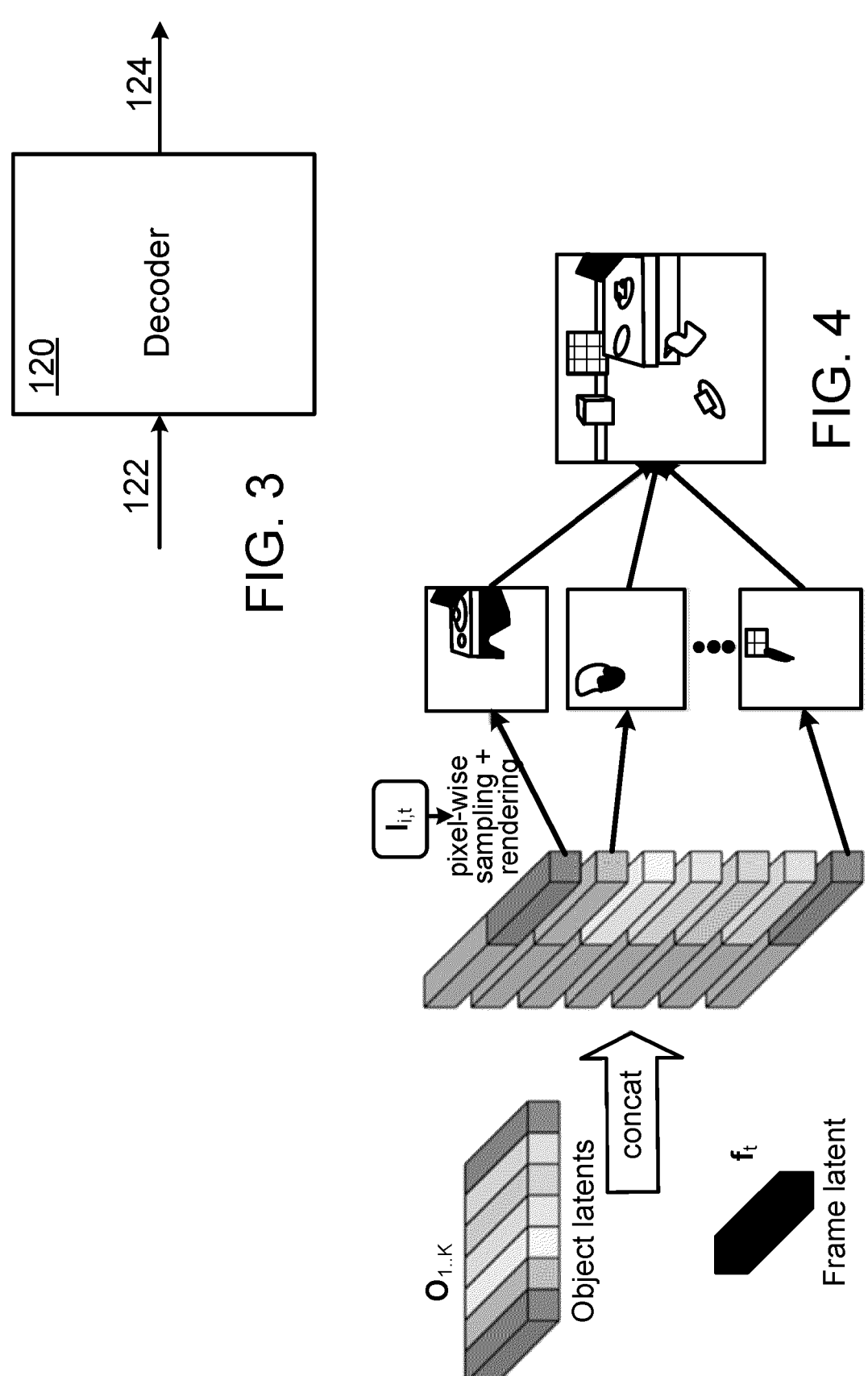
FIG. 3 shows an image frame decoder neural network of the video object representation neural network system configured to decode latent variables into pixel values.
FIG. 4 is a schematic illustration of a decoding process performed by a decoder of the video object representation neural network system.

In generating the input 124 for time t, the object latent variables O may be concatenated with the frame latent variables $f_t$ for the time step being decoded, as schematically illustrated in FIG. 4 which schematically illustrates the process of decoding a single image frame for a time t. In FIG. 4, the frame latent variable $f_t$ is concatenated with each of the frame latent variables $o_{t \dots k}$. The concatenated latent variables are sampled for each location $l_i$ to render each pixel and generate a pixel mixture model. The frame latent variables concatenated with the object latent variables may be inferred from the same input sequence from which the object latent variables were inferred. Alternatively, the frame latent variables may be from a different input sequence. In this way, global/view content (such as lighting and camera pose) from one input sequence may be transferred to a different input sequence.

In an example implementation, the system 100 may be used to generate novel representations. For example, the system 100 may be trained to generate video image sequences conditional upon a conditioning input that may define one or more objects or object properties for one or more objects in the video sequence 104. For example, the conditioning input may define objects to be included in the generated video image sequence 124, and/or may define properties of objects. Alternatively or additionally, the conditioning input may define a static or changing viewpoint position or orientation. Conditional priors may be learned for objects in a scene. For example, a neural network (e.g. a recurrent neural network) may be used to learn conditional priors for objects in a scene and for successive frame latents.

Additionally, while the above described example implementation determines both object latent variables and frame latent variables, it is to be understood that it is not necessary to determine and/or output both object and frame latent variables. For example, rather than encoding/inferring frame latent variables, the encoder 102 and decoder 120 may be conditioned on a ground-truth viewpoint/camera pose directly. That is, rather than operating entirely unsupervised, the neural network 100 may be "view-supervised". A comparison of such a view-supervised approach to other view-supervised models is shown in FIG. 7 and discussed in more detail below. In a view supervised system, during decoding, the decoder may be provided with a novel viewpoint (i.e. a viewpoint that was not provided to the system during training) to generate a view from an unseen viewpoint.

Figure 5:
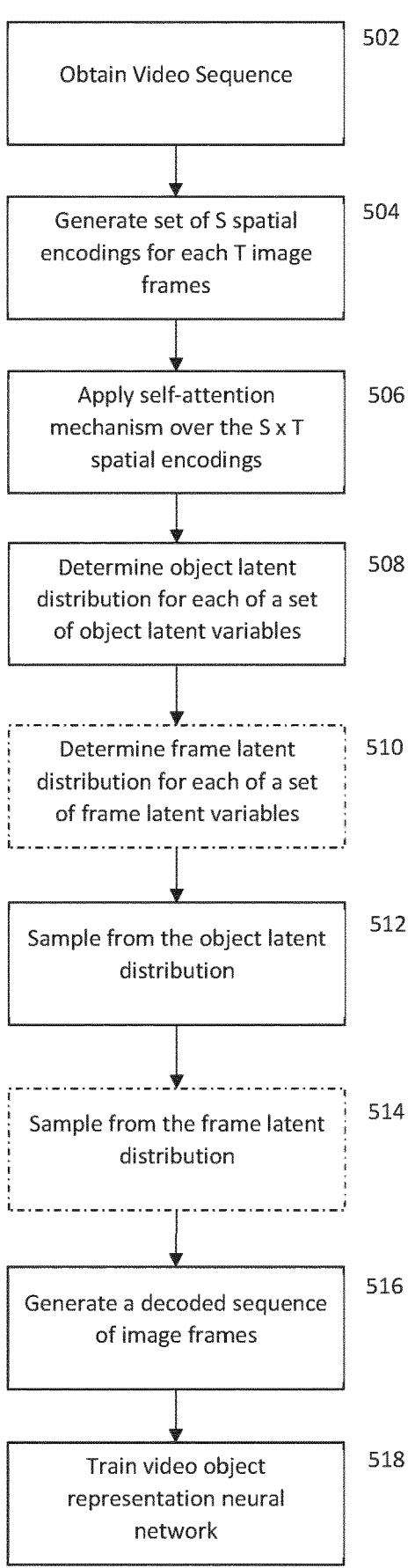
FIG. 5 is a flow diagram of an example process for training a video object neural network using the system.

FIG. 5 is a flow diagram of an exemplary method for training a video object representation neural network system, which may be arranged in accordance with the video object representation neural network system 100.

At a first step 502, a video sequence (such as the video sequence 104) is obtained. The video sequence comprises a sequence of T image frames, one at each of a succession of times 1. At step 504, each image frame in the video sequence is processed (for example by the feature extraction network 106) to generate a set of S spatial encodings for each of the T image frames, thereby generating a group of S×T spatial encodings for the video sequence.

At step 506 the group of S×T spatial encodings is processed by a self-attention neural network by applying a self-attention mechanism (for example by the self-attention network 108) over a layer input comprising the group of S×T spatial encodings (such as the layer input 107) to generate an output comprising a group of transformed spatial encodings (such as the output 109). Each transformed spatial encoding corresponds to an image frame in the obtained video sequence and to an image frame region. Applying the self-attention mechanism over the layer input includes applying the self-attention mechanism over the spatial encodings of different image frames of the obtained video sequence.

At step 508, there is determined, for each of a set of object latent variables O, one or more values parameterizing an object latent distribution of the object latent variable, by aggregating the group of transformed spatial encodings over times of the image frames.

Where the video object representation neural network system is to infer frame latent variables, there may be determined at optional step 510, for each of a set of frame latent variables F, one or more values parameterizing a frame latent distribution of the frame latent variable, by aggregating the group of transformed spatial encodings over regions of the image frames. Alternatively, and as described above, the encoder may instead be conditioned on a viewpoint directly.

At step 512 there is determined a value for each of the set of object latent variables by sampling from the object latent distribution for the object latent variable.

Where the video object representation neural network system is to infer frame latent variables, there may be determined, at optional step 514, a value for each of the set of frame latent variables by sampling from the frame latent distribution for the frame latent variable. Alternatively, and as described above, the encoder may not infer frame latent variables in which case a frame latent distribution is not inferred.

At step 516 a decoded sequence of image frames is generated. That is, the determined values of the object latent variables (and where appropriate any determined values of the frame latent variables) are processed (for example by the decoder 120) to generate a decoded sequence of image frame (for example the output 124).

In implementations the system is trained by backpropagating gradients of the objective function through the image frame decoder neural network, the self-attention neural network, and the feature extraction neural network. Backpropagating through the sampling step may involve the so-called re-parameterization trick (Kingma et al., arXiv1312.6114).

At step 518, the system is trained by adjusting at least values of the self-attention neural network parameters to optimize an objective function dependent on i) a measure of a difference between the sequence of T image frames and the decoded sequence of image frames, ii) a difference between each of the object latent distributions and a prior object latent distribution, and optionally (i.e. where frame latent variables are generated) iii) a difference between each of the frame latent distributions and a prior frame latent distribution.

The training may comprise backpropagation. In particular, training may comprise backpropagating gradients of the objective function through the decoder neural network generating the decoded sequence of image frames (e.g. the decoder 120 generating the output 124) and the self-attention neural network (e.g. the self-attention network 108). The gradients of the objective function may further be backpropagated through the feature extraction neural network generating the set of spatial encodings (e.g. the feature extraction network 106). It will be appreciated, however, that networks in the system 100 (such as, for example, the feature extraction neural network) may be trained separately.

The objective function (to minimize) may be a negative lower bound, e.g. an evidence lower bound (ELBO) as defined in equation (3).

$$\frac{-\alpha}{T_d H_d W_d} \sum_{t=1}^{T_d} \sum_{i=1}^{H_d W_d} \log p(x_{t,i}|o_1, \ldots, o_K, f_t; t, l_i) + \quad (3)$$

-continued $$\frac{\beta_0}{K} \sum_k D_{KL}(q(o_k|X)\|p(o_k)) + \frac{\beta_f}{T} \sum_t D_{KL}(q(f_t|X)\|p(f_t))$$

where $\alpha$, $\beta_o$ and $\beta_f$ are respective weights, q represents the encoder 102, p represents the decoder 120, and $D_{KL}$ is a metric of a difference in distributions such as a Kullback-Leibler divergence.

That is, the data log-likelihood may be normalized by the number of decoded pixels $(T_d\, H_d\, W_d)$ to allow for decoding fewer than all input pixels. Advantageously, this helps scale the size of the decoder without reducing the learning signal due to correlations prevalent between adjacent pixels. Normalizing by $1/T_d\, H_d\, W_d$ has been found to facilitate consistent learning dynamics regardless of the choice of how many pixels are decoded. $\alpha$ may be set to 1, but may also be adjusted, for example if the scale of $\beta_o$ and $\beta_f$ is too small to be numerically stable. Example implementations have used $\beta_o=\beta_f$.

Training the system at step 518 may also comprise adjusting values of feature extraction neural network parameters of a feature extraction neural network, such as the feature extraction neural network 106. Training the system at step 518 may also, or alternatively, comprise adjusting values of decoder neural network parameters of a decoder neural network, such as the decoder neural network 120.

Once trained, either the decoder part or the encoder part of the system may be used independently. For example, the encoder part of the system may be used to obtain one or more properties of one or more objects depicted in a video sequence from the object latent variables, or from the values parameterizing the object latent distributions, e.g. from means of the distributions. Properties such as object size, color, texture, position in 1D, 2D or 3D, or motion may be obtained. Similarly, once trained, the video object representation neural network system, more particularly just the encoder part, may be used to obtain one or more global properties of frames of the video sequence from the frame latent variables or from the values parameterizing the frame latent distributions, e.g. a position or orientation, e.g. pose, of a (changing) viewpoint for the video sequence.

Figure 6:
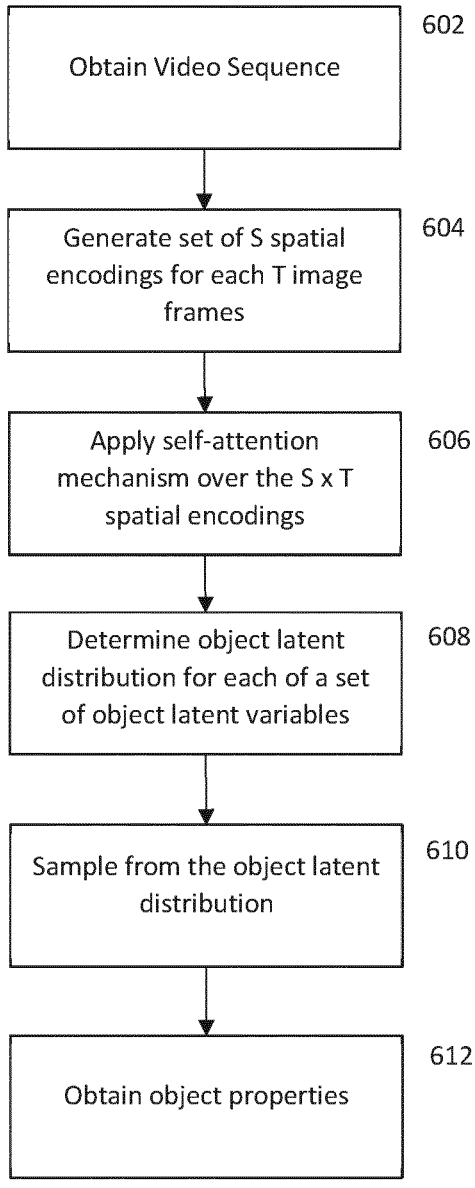
FIG. 6 is a flow diagram of a process for obtaining object properties using a trained encoder part of the video object representation neural network system.
Figure 8:
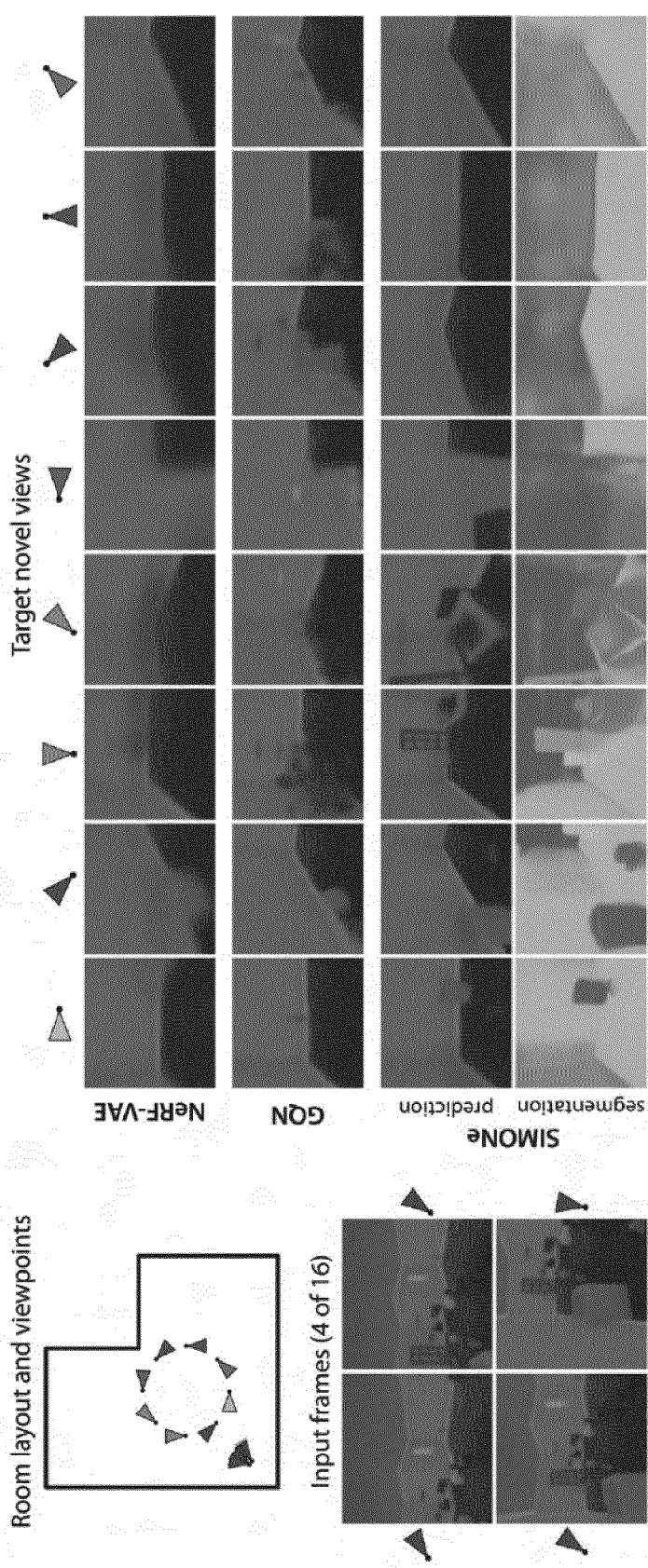
FIG. 8 shows a comparison of a view synthesis task performed by the video object representation neural network system and two other neural network models.

FIG. 6 is a flowchart depicting an example process for obtaining one or more properties of one or more objects depicted in a video sequence. At step 602 a video sequence is obtained (such as the video sequence 104). The video sequence comprises a sequence of T image frames, one at each of a succession of times t.

At step 604, each image frame in the video sequence the video sequence is processed, for example by a trained feature extraction network 106, to generate a set of S spatial encodings for each of the T image frames, thereby generating a group of S×T spatial encodings for the video sequence.

At step 606 the group of S×T spatial encodings is processed by a trained self-attention neural network by applying a self-attention mechanism (for example by the self-attention network 108) over a layer input comprising the group of S×T spatial encodings (such as the layer input 107) to generate an output comprising a group of transformed spatial encodings (such as the output 109). Each transformed spatial encoding corresponds to an image frame in the obtained video sequence and to an image frame region. Applying the self-attention mechanism over the layer input includes applying the self-attention mechanism over the spatial encodings of different image frames of the obtained video sequence.

At step 608, there is determined, for each of a set of object latent variables O, one or more values parameterizing an object latent distribution of the object latent variable, by aggregating the group of transformed spatial encodings over times of the image frames.

At step 610, there is determined a value for each of the set of object latent variables by sampling from the object latent distribution for the object latent variable.

At step 612, the determined values for each of the set of object latent variables are used to obtain one or more properties of one or more objects depicted in the video sequence.

Where the video object representation neural network system is to infer frame latent variables, there may be determined, at optional step 614, a value for each of the set of frame latent variables by sampling from the frame latent distribution for the frame latent variable. Alternatively, and as described above, the encoder may not infer frame latent variables in which case a frame latent distribution is not inferred.

It will be appreciated that while FIG. 6 is described in terms of determining object latent variables, the method may alternatively, or additionally, include determining frame latent variables to determine one or more global properties of frames of the video sequence.

In another example, only a decoder part of the system may be needed, that is a part of the system from a video sequence input to a part configured to determine the object (and optionally frame) latent distribution. The encoder part may optionally include a part configured to sample from these distributions (in other implementations information may be derived e.g. from a mean of these distributions). In some applications once trained, only a trained decoder part of the system may be needed, e.g. to generate video sequences of 2D or 3D images. FIG. 7 is a flow diagram depicting an example process for generating a video sequence using a trained video generation neural network system. At step 702, values for each of a set of object latent variables is determined by sampling from a respective prior object latent distribution for the object latent variable. After step 702, steps 704, 706 and 708 are performed for each pixel of each generated image frame and for each generated image frame time step. At step 704, a trained decoder neural network processes the determined values of the object latent variables, information specifying a location of the pixel, and information specifying the time step to determine, for the pixel and for the time step, parameters of a pixel distribution for each of the object latent variables. At step 706, the trained decoder neural network combines the pixel distributions for each of the object latent variables to determine a combined pixel distribution. The processing at step 706 may further comprise processing the determined values of the object latent variables, information specifying a location of the pixel, and information specifying the time step to determine, for the pixel and for the time step, a mixing weight for each of the object latent variables, and combining the pixel distribution for each object latent variable weighted by the respective mixing weight to determine the combined pixel distribution. At step 708, the trained decoder neural network samples from the combined pixel distribution to determine a value for the pixel at the time step.

An example of a view-supervised video object representation neural network was experimentally compared to similar models, GQN (Eslami SMA et. al., Neural scene representation and rendering. Science. 2018 Jun. 15; 360(6394): 1204-1210. doi: 10.1126/science.aar6170. PMID: 29903970) and NeRF (arXiv:2003.08934).

FIG. 7 shows a comparison of scene representation and view interpolation capabilities between a view supervised version of the video object representation neural network (labelled SIMONe in FIG. 7), NeRF-VAE, and GQN. All models partially observe a procedurally generated "Playroom" dataset from a given sequence of frames (4 of the 16 input frames fed to the models are visualised). Novel views are decoded on a circular trajectory around the room, with the yaw linearly spaced in $[-\pi, \pi]$. It can be seen that NeRF-VAE retains very little object structure, blurring out nearly all objects in the scene. NeRF does but understands the geometry of the generated room and is able to infer wall color. GQN produces more detailed reconstructions, but overfits to particular views and does not interpolate smoothly. GQN hallucinates content. SIMONe on the other hand produces sharp reconstructions of fine object structure. Even when it observes objects at a distance or up close, it places and sizes them correctly in totally novel views. This makes SIMONe a powerful choice over NeRF-VAE and GQN-style models when the priority is to capture scene structure across diverse examples. SIMONe also segments the scene.

It will be appreciated that a video object representation neural network may be provided which processes an input sequence to determine and output only object latent variables or only frame latent variables.

In another experiment, an unsupervised video object representation neural network (inferring both object and frame latent variables) was compared to other viewpoint unaware unsupervised approaches. Table 1 shows segmentation performance (in terms of Adjusted Rand Index for foreground objects, ARI-F) of a video object representation neural network as described with reference to FIG. 1 (labelled SIMONe in table 2) compared to MONet (arXiv: 1901.11390), Slot Attention (SA) (arXiv:2006.15055), and a video model (S-IODINE). Static (S) and video (S) ARI-F scores were calculated separately. For static ARI-F, the models were evaluated per still image. For video ARI-F, the models were evaluated across space and time, taking an object's full trajectory as a single class. The video ARI-F thus penalizes models which fail to track objects stably. This is especially true for Slot Attention since it tends to output the objects in an arbitrary order for each frame in a sequence.

TABLE 1

| | Static ARI-F | | | Video ARI-F | | | |
|---|---|---|---|---|---|---|---|
| | MONet | SA | S-IODINE | MONet | SA | S-IODINE | SIMONe |
| Objects Room 9 | 0.886 (±0.061) | 0.784 (±0.138) | 0.695 (±0.007) | 0.865 (±0.xxx) | 0.066 (±0.014) | 0.673 (±0.xxx) | 0.909 (±0.xxx) |
| CATER | 0.937 (±0.xxx) | 0.923 (±0.076) | 0.747 (±0.xxx) | 0.412 (±0.xxx) | 0.073 (±0.006) | 0.695 (±0.xxx) | 0.952 (±0.xxx) |
| Playroom | 0.647 (±0.012) | 0.653 (±0.024) | 0.414 (±0.xxx) | 0.442 (±0.xxx) | 0.059 (±0.002) | 0.345 (±0.xxx) | 0.833 (±0.xxx) |

Table 2 provides an example two possible architectures for the system 100. It will be appreciated that the architectures depicted in table 1 are not intended to be limiting and are provided merely as an illustration of possible architectures. In Table 1, c is the number of channels, k is the kernel size, s is the stride, Pos. MPL is a multi-layer perceptron applied to a positioning encoding. MLP([m, n]) refers to a two-layer MLP with m and n units in each layer, respectively; GRU is a gated recurrent unit.

latent variables, or the values parameterizing the object latent distributions, may be provided as an input to one or more classifier neural network layers. There are many image classifiers and any appropriate model may be used. More generally, the video object representation neural network system can be configured to generate any appropriate neural network output that characterizes the entity. For example, the neural network output can be a classification output (e.g. defining a score for each category of a set of possible

TABLE 2

| Exemplary architecture. | | |
| --- | --- | --- |
| | Small | Large |
| Encoder CNN | Conv2D(c = 64, k = 5, s = 1) | Conv2D(c = 512, k = 5, s = 1) |
| | Conv2D(c = 64, k = 5, s = 1) | Conv2D(c = 512, k = 5, s = 1) |
| | Conv2D(c = 64, k = 5, s = 1) | Conv2D(c = 512, k = 5, s = 1) |
| | Conv2D(c = 64, k = 5, s = 1) | Conv2D(c = 512, k = 5, s = 1) |
| Pos. MPL | MPL(64) | MPL(512) |
| Output MPL | MPL([64, 64]) | MPL([512, 512]) |
| Slot Attention | num iterations = 3, slot size = 32 | num iterations = 3, slot size = 32 |
| | GRU(32) | GRU(32) |
| | MPL(128) | MPL(512) |
| Decoder CNN | Conv2DTranspose(c = 64, k = 5, s = 1) | Conv2DTranspose(c = 512, k = 5, s = 1) |
| | Conv2DTranspose(c = 64, k = 5, s = 1) | Conv2DTranspose(c = 512, k = 5, s = 1) |
| | Conv2DTranspose(c = 64, k = 5, s = 1) | Conv2DTranspose(c = 512, k = 5, s = 1) |
| | Conv2DTranspose(c = 64, k = 5, s = 1) | Conv2DTranspose(c = 512, k = 5, s = 1) |
| | Conv2DTranspose(c = 64, k = 5, s = 1) | Conv2DTranspose(c = 512, k = 5, s = 1) |
| | Conv2D(c = 64, k = 5, s = 1) | Conv2D(c = 4, k = 5, s = 1) |
| Pos. MPL | MPL([64, 64]) | MPL([512, 32]) |

In experiments, different ways to use the object and frame latent variables to enable better pixel reconstruction were explored. In initial experiments, the sampled object latent variables $o_k$ and frame latent variable $f_t$ were copied and tiled spatially across all pixels and time points before being provided to the decoder (in experiments, a convolutional decoder). However, it was found that it is possible to take independent samples in order to seed the first stage of the decoder, before applying a convolutional decoder stack. Additionally, it was discovered to be beneficial to independently sample across time when appropriate. In summary, samples $o_{k,i,t} \sim q(o_k|X)$ were taken (independently for all pixels I=64·64 and time frames T) and $f_{k,i,t} \sim q(ft|X)$ (independently for all slots K and all pixels I=64·64). It was found that this improved performance, especially early in training.

Without wishing to be bound by theory, this may be due to a reduction in the gradient bias involved with copying the same samples $o_k$ and $f_t$ across all space/time in a sequence. Taking multiple independent samples acts as a regularizer.

The (trained) video object representation neural network system, more particularly just the encoder part, may be used to obtain one or more properties of one or more objects depicted in the video sequence from the object latent variables, or from the values parameterizing the object latent distributions, e.g. from means of the distributions. Properties such as object size, color, texture, position in 1D, 2D or 3D, motion may be obtained. Similarly the (trained) video object representation neural network system, more particularly just the encoder part, may be used to obtain one or more global properties of frames of the video sequence from the frame latent variables or from the values parameterizing the frame latent distributions, e.g. a pose at a particular frame of the video sequence.

The (trained) video object representation neural network system, more particularly just the encoder part, may be used for image classification using the determined latent variables. For example, one or more of the determined object categories), a regression output, a sequence output (i.e., that includes a sequence of output elements), a segmentation output, or a combination thereof.

The determined latent variables (of the trained system) can provide an input to another system e.g., for use in performing a machine learning task on the network inputs. Example tasks may include feature based retrieval, clustering, near duplicate detection, verification, feature matching, domain adaptation, video based weakly supervised learning; and for video e.g. object tracking across video frames, gesture recognition of gestures that are performed by entities depicted in the video.

The (trained) video object representation neural network system, more particularly just the decoder part, may be used to generate a new video sequence comprising a decoded sequence of new image frames. This may be achieved by determining a value for each of the set of object latent variables by sampling from a prior object latent distribution for the object latent variable, determining a value for each of the set of frame latent variables by sampling from a prior frame latent distribution for the frame latent variable (which may be the same as the prior object latent distribution), and processing the determined values, in particular using an image frame decoder neural network as described above, to generate the decoded sequence of new image frames. Optionally the image frame decoder neural network may be conditioned on, i.e. may generate image frames dependent upon, a conditioning input to the image frame decoder neural network as previously described.

The (trained) encoder part of the video object representation neural network system may be used to determine values for the sets of object and frame latent variables, and then one or more of these may be modified and provided to the decoder of the video object representation neural network to generate a modified version of an input video sequence.

In some implementations once trained the video object representation neural network system, more particularly just the encoder part, may be used to control an agent to perform a particular task while interacting with an environment. The agent may be a mechanical agent such as a robot or an autonomous vehicle and the environment may be a real-world environment. Such as use may method comprise, e.g. for successive time-steps, obtaining an observation characterizing a current state of the environment, the observation including an observation video sequence, e.g. by obtaining successive image frames of a video sequence. The trained video object representation neural network system may then be used to process the observation video sequence to obtain the values parameterizing the object latent distributions and the values parameterizing the frame latent distributions, and optionally the object latent variables and the frame latent variables. These may then be processed using a control system to generate a control output, the control system thereby processing data from the observation. The observation may be provided to the control system in addition to the latent variables or their distributions. The control system may comprise an action selection policy neural network e.g. in a reinforcement learning system, and the control output may comprise an action selection policy output. An action to be performed by the agent may then be selected in response to the observation. The action may be implemented by the agent using the control output, or the control output may be provided for the agent to implement the action.

This may include providing action data to the agent to perform an action and/or a control signal or data such as electronic control data e.g. motor control data. That is the control output may comprise action data, a control signal, or similar. For example the control output may comprise control signals to control a physical behavior of the mechanical agent e.g. robot, e.g., torques for the joints of the robot or higher-level control commands; or to control the autonomous vehicle, e.g., torques to control elements of the vehicle or higher-level control commands. The selected actions may define for example, position, velocity, or force/torque/acceleration data for one or more joints of a robot or parts of another mechanical agent.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method of training a video object representation neural network system, the video object representation neural network system including a self-attention neural network comprising one or more self-attention layers, each configured to apply a self-attention mechanism over a layer input, and having a plurality of self-attention neural network parameters, the method comprising:

obtaining a video sequence comprising a sequence of T image frames, one at each of a succession of times;

processing each of the image frames to generate a set of S spatial encodings for each of the T image frames thereby to obtain a group of S×T spatial encodings for the video sequence, wherein each spatial encoding of an image frame comprises an encoding of a respective region of the image frame;

processing the group of S×T spatial encodings using the self-attention neural network by applying the self-attention mechanism over a layer input comprising the group of S×T spatial encodings to generate a group of transformed spatial encodings each corresponding to an image frame time and to an image frame region, wherein applying the self-attention mechanism over the layer input includes applying the self-attention mechanism over the spatial encodings of different image frames;

determining, for each of a set of object latent variables, one or more values parameterizing an object latent distribution of the object latent variable, by aggregating the group of transformed spatial encodings over times of the image frames;

determining a value for each of the set of object latent variables by sampling from the object latent distribution for the object latent variable;

processing the determined values of the object latent variables to generate a decoded sequence of image frames; and training the system by adjusting at least values of the self-attention neural network parameters to optimize an objective function dependent on i) a measure of a difference between the sequence of T image frames and the decoded sequence of image frames and ii) a difference between each of the object latent distributions and a prior object latent distribution.

2. The method of claim 1, further comprising:

determining, for each of a set of frame latent variables, one or more values parameterizing a frame latent distribution of the frame latent variable, by aggregating the group of transformed spatial encodings over regions of the image frames;

determining a value for each of the set of frame latent variables by sampling from the frame latent distribution for the frame latent variable;

wherein generating a decoded sequence of image frames further comprises processing the determined values of the frame latent variables to generate the decoded sequence of image frames.

3. The method of claim 2, wherein training the system comprises adjusting at least values of the self-attention neural network parameters to optimize the objective function dependent on a difference between each of the frame latent distributions and a prior frame latent distribution.

4. The method of claim 1, wherein each spatial encoding comprises a feature map of the respective region of the image frame, wherein processing each of the image frames to generate the set of S spatial encodings for each of the T image frames comprises processing each of the image frames using a feature extraction neural network having a plurality of feature extraction neural network parameters to generate the feature map for each region of the image frame; and wherein training the system includes adjusting values of the feature extraction neural network parameters.

5. The method of claim 2, further comprising using the trained video object representation neural network system to obtain, from the frame latent variables or from the values parameterizing the frame latent distributions, a position or orientation of a viewpoint for the video sequence.

6. The method of claim 1, comprising processing the determined values of the object latent variables using an image frame decoder neural network having a plurality of image frame decoder neural network parameters to generate the decoded sequence of image frames; and wherein training the system further comprises adjusting values of the image frame decoder neural network parameters.

7. The method of claim 6 wherein the decoded sequence of image frames comprises an image frame for each of a succession of decoded image frame time steps, and wherein using an image frame decoder neural network to generate the decoded sequence of image frames comprises, for each pixel of each decoded image frame and for each decoded image frame time step:

processing, using the image frame decoder neural network, the determined values of the object latent variables, information specifying a location of the pixel, and information specifying the time step to determine, for the pixel and for the time step, parameters of a pixel distribution for each of the object latent variables;

combining the pixel distributions for each of the object latent variables to determine a combined pixel distribution; and sampling from the combined pixel distribution to determine a value for the pixel and for the time step.

8. The method of claim 7 further comprising, for each pixel of each decoded image frame and for each decoded image frame time step:

processing, using the image frame decoder neural network, the determined values of the object latent variables, information specifying a location of the pixel, and information specifying the time step to determine, for the pixel and for the time step, a mixing weight for each of the object latent variables; and wherein combining the pixel distributions for each of the object latent variables to determine a combined pixel distribution comprises combining the pixel distribution for each object latent variable weighted by the respective mixing weight.

9. The method of claim 6, further comprising:

obtaining a conditioning input defining one or more objects or object properties for one or more objects in the video sequence, or defining a viewpoint position or orientation; and providing the conditioning input to the self-attention neural network and to the image frame decoder neural network.

10. The method of claim 1, wherein processing the group of S×T spatial encodings using the attention neural network comprises processing the layer input comprising the group of S×T spatial encodings using one of the one or more self-attention layers to generate a query and a key-value pair for each of the spatial encodings, and using the self-attention mechanism to apply the queries to the key-value pairs to determine the group of transformed spatial encodings; and wherein the self-attention neural network parameters comprise parameters of learned transformations applied to the layer input to generate the queries and key-value pairs.

11. The method of claim 1, wherein processing the group of S×T spatial encodings using the attention neural network comprises:

providing the group of S×T spatial encodings as the layer input to a first self-attention layer of the attention neural network to generate a first self-attention layer output; and providing first self-attention layer output to a second self-attention layer of the attention neural network to generate the group of transformed spatial encodings; including reducing the number of spatial encodings from S×T spatial encodings to K×T spatial encodings, where K is the number object latent variables and K is less than S.

12. The method of claim 11 wherein the reducing comprises applying a pooling operation over the first self-attention layer output.

13. The method of claim 1, wherein training the system comprises backpropagating gradients of the objective function through an image frame decoder neural network generating the decoded sequence of image frames, the self-attention neural network, and a feature extraction neural network generating the set of spatial encodings.

14. The method of claim 1, further comprising using the trained video object representation neural network system to obtain one or more properties of one or more objects depicted in the video sequence from the object latent variables or from the values parameterizing the object latent distributions.

15. The method of claim 1, further comprising using the trained video object representation neural network system to generate a new video sequence comprising a decoded sequence of new image frames, by:

determining a value for each of the set of object latent variables by sampling from a prior object latent distribution for the object latent variable;

processing the determined values of the object latent variables to generate the decoded sequence of new image frames.

16. The method of claim 15, further comprising:

determining a value for each of the set of frame latent variables by sampling from a prior frame latent distribution for the frame latent variable; and processing the determined values of the object latent variables and the determined values of the frame latent variables to generate the decoded sequence of new image frames.

17. The method of claim 1, further comprising using the trained video object representation neural network system to generate a modified video sequence comprising a decoded sequence of modified image frames, by:

obtaining an input video sequence comprising a sequence of input image frames;

processing each of the input image frames to obtain a group of spatial encodings for the input video sequence;

processing the group of spatial encodings for the input video sequence using the attention neural network to generate a group of transformed spatial encodings;

determining values for the set of object latent variables by sampling from object latent distributions determined from the group of transformed spatial encodings;

modifying the determined values for the set of object latent variables, to obtain a modified set of latent variables; and processing the modified set of latent variables to generate the decoded sequence of modified image frames.

18. The method of claim 17, further comprising determining values for the set of frame latent variables by sampling from frame latent distributions determined from the group of transformed spatial encodings;

modifying the determined values for the set of frame latent variables, to obtain the modified set of latent variables.

19. One or more non-transitory computer-readable storage media storing instructions that when executed by one or more computers cause the one or more computers to perform operations for training a video object representation neural network system, the video object representation neural network system including a self-attention neural network comprising one or more self-attention layers, each configured to apply a self-attention mechanism over a layer input, and having a plurality of self-attention neural network parameters, the operations comprising:

obtaining a video sequence comprising a sequence of T image frames, one at each of a succession of times;

processing each of the image frames to generate a set of S spatial encodings for each of the T image frames thereby to obtain a group of S×T spatial encodings for the video sequence, wherein each spatial encoding of an image frame comprises an encoding of a respective region of the image frame;

processing the group of S×T spatial encodings using the self-attention neural network by applying the self-attention mechanism over a layer input comprising the group of S×T spatial encodings to generate a group of transformed spatial encodings each corresponding to an image frame time and to an image frame region, wherein applying the self-attention mechanism over the layer input includes applying the self-attention mechanism over the spatial encodings of different image frames;

determining, for each of a set of object latent variables, one or more values parameterizing an object latent distribution of the object latent variable, by aggregating the group of transformed spatial encodings over times of the image frames;

determining a value for each of the set of object latent variables by sampling from the object latent distribution for the object latent variable;

processing the determined values of the object latent variables to generate a decoded sequence of image frames; and training the system by adjusting at least values of the self-attention neural network parameters to optimize an objective function dependent on i) a measure of a difference between the sequence of T image frames and the decoded sequence of image frames and ii) a difference between each of the object latent distributions and a prior object latent distribution.

20. A system comprising one or more computers and one or more storage devices storing instructions that when executed by one or more computers cause the one or more computers to perform operations for training a video object representation neural network system, the video object representation neural network system including a self-attention neural network comprising one or more self-attention layers, each configured to apply a self-attention mechanism over a layer input, and having a plurality of self-attention neural network parameters, the operations comprising:

obtaining a video sequence comprising a sequence of T image frames, one at each of a succession of times;

processing each of the image frames to generate a set of S spatial encodings for each of the T image frames thereby to obtain a group of S×T spatial encodings for the video sequence, wherein each spatial encoding of an image frame comprises an encoding of a respective region of the image frame;

processing the group of S×T spatial encodings using the self-attention neural network by applying the self-attention mechanism over a layer input comprising the group of S×T spatial encodings to generate a group of transformed spatial encodings each corresponding to an image frame time and to an image frame region, wherein applying the self-attention mechanism over the layer input includes applying the self-attention mechanism over the spatial encodings of different image frames;

determining, for each of a set of object latent variables, one or more values parameterizing an object latent distribution of the object latent variable, by aggregating the group of transformed spatial encodings over times of the image frames;

determining a value for each of the set of object latent variables by sampling from the object latent distribution for the object latent variable;

processing the determined values of the object latent variables to generate a decoded sequence of image frames; and training the system by adjusting at least values of the self-attention neural network parameters to optimize an objective function dependent on i) a measure of a difference between the sequence of T image frames and the decoded sequence of image frames and ii) a difference between each of the object latent distributions and a prior object latent distribution.

*   *   *   *   *